United States Patent [19]

Fontanella

[11] Patent Number: 4,645,346
[45] Date of Patent: Feb. 24, 1987

[54] DEVICE FOR ANALYZING AND CORRECTING WAVEFRONT SURFACES IN REAL TIME

[75] Inventor: Jean-Claude Fontanella, Chatillon, France

[73] Assignee: Office National d'Etudes et de Recherche Aerospatiale, Chatillon, France

[21] Appl. No.: 731,896

[22] Filed: May 8, 1985

[30] Foreign Application Priority Data

May 11, 1984 [FR] France ................................ 84 07370

[51] Int. Cl.$^4$ ................................................ G01B 9/02
[52] U.S. Cl. ................................................ 356/353
[58] Field of Search ................................ 356/353, 354

[56] References Cited

U.S. PATENT DOCUMENTS 3,825,348 7/1974 Nomarski et al. .................. 356/349

OTHER PUBLICATIONS

Marty et al., "Radial Shearing Interferometers Using a Laser Source", Applied Optics, vol. 12, No. 11, pp. 2765-2767, 11/73.
Roddier et al., "A Rotation Shearing Interferometer with Phase-Compensated Roof-Prisms, J. Optics, vol. 9, No. 3, pp. 145-149 6/78.

Primary Examiner—Davis L. Willis
Assistant Examiner—Matthew W. Koren
Attorney, Agent, or Firm—Laubscher & Laubscher

[57] ABSTRACT

An optical system for analyzing and correcting distorted wavefronts comprising a deformable mirror for correcting said wavefronts; a system for analyzing and detecting phase distortions; an interferometer with lateral shearing constituting the analyzing and detecting system, for receiving the distorted wavefront for analysis, and for duplicating it and deducing from two neighboring points of the wavefront thus obtained signals for controlling deformation of said deformable mirror, wherein the interferometer with lateral shearing is formed of two 90° reflecting dihedrons, the bisecting lines of which cross at the center of the interferometer, and one of the dihedrons can be moved through a predetermined distance parallel to the bisecting plane of the other, the other dihedron being vibrated cyclically parallel with its own bisecting plane.

5 Claims, 5 Drawing Figures

Position of the 21 actuators 51 in the pupil

Position of 16 photo detector in the mosaic identical for $\Delta x$ and $\Delta y$

DEVICE FOR ANALYZING AND CORRECTING WAVEFRONT SURFACES IN REAL TIME

BACKGROUND OF THE INVENTION

1. Field of the Invention

The present invention relates, generally speaking, to the analysis and correction of wave surfaces in real time and, more particularly, to an interferometer with shearing or lateral duplication that serves in measuring the phase distortion of a wave-front.

Wave surfaces analysis includes the measurement of the phase differences in the wave delivered by an optical system or instrument with respect to a reference wave surface that would have resulted from the same optical system if assumed to be perfect and unaffected by the atmospheric turbulence.

The wave can be adversely affected by aberrations in the instrument (e.g. in the case of a very large mirror becoming defomed under the effect of various stresses, or a mosaic system made up of multiple mirrors) or by phenomena related to atmospheric propagation (turbulence, thermal defocalization).

The advantage of wavefront analysis in real time is to be able to apply a correction instantaneously to the wave surface using a deformable mirror or, more generally, an adaptive optical system, and thus to free the system of the aforesaid disturbences.

2. Description of the Prior Art

In the current state of the art, wavefront analysis and correction systems working in real time have two types of application both requiring very high spatial resolution (i.e., less than or equal to 100 μrad), and fine aiming for a laser beam and very long range imagery (astronomy, satellite observation). In these applicational fields, the apertures in questions are approximately one meter in dimension and the adaptive optical arrangement makes it possible to reach a resolution limit dependent solely on diffraction and no longer on phase defects.

In high-power laser aiming systems based on what are called "return waves", use is made of a wave surface analyzer on the basis of which a deformable mirror is positioned in order to transmit a conjugate wave of the wave received and which focuses perfectly on the target.

As far as very long range optical imagery systems are concerned, it is possible with the wave surface analyzing device to detect phase distorsions in the wave front falling on the entrance pupil into the optical system, and a deformable mirror is controlled by the analyzing device in order to correct the wave front for the distorsions thus detected.

Optical systems are known, as shown by the U.S. Pat. No. 3,923,400 to Hardy, for example, for forming the image of an object through the atmosphere, where such systems comprise a device working in real time for detecting and correcting the phase of the wavefront as seen by these optical systems, said device comprising:

(a) interferometer means based on shearing or lateral duplication for receiving the disturbed wavefront, determining the relative phase differences in real time between the various regions in thus disturbed wavefront and producing signals representing the said phase differences;

(b) means responding to the said phase-difference signals for simultaneously producing, in parallel and in real time, signals representing phase corrections to be made to the various regions in the disturbed wavefront in order to obtain a corrected wavefront; and (c) phase correcting means receiving the disturbed wavefront and responding to the phase correcting signals to modify the phase differences in real time between the various regins of the disturbed wave front and change the shape of this disturbed wave front to generate a corrected wave front.

The purpose of the lateral-duplication interferometer is to duplicate the wavefront to measure the phase difference between the two overlapping regions of the wavefront. To measure this phase difference, at the output from a detector placed in the interference plane, an interference signal is created with modulation thereof obtained by moving one of the portions of the lateral-duplication interferometer.

In the aforesaid Hardy patent, the lateral-shear interferometer is formed of an optical diffraction grating producing two cones in two slightly divergent angular directions with a common area of overlap. The wavefront is therefore duplicated and it is possible to measure the phase difference between two neighbouring areas of the wavefront. This is achieved by modulating the interference pattern and by detecting the relative phase of this interference pattern at various points therein. The use in the aforesaid Hardy patent of an interferometer with lateral shear and diffraction grating results in difficulties in tuning the interferometer due to the existence of different diffraction orders within a grating and the need for overlap between just two orders, only 0 and 1 or −1 and 0.

The diffraction gratings in the prior art are moved either in translation or in rotation (cf. "Radial Grating Shear Heterodyne Interferometer", by Chris L. Koliopoulos, Apllied Optics, May 1, 1980, vol. 19, no. 9, pages 1523 and sq.) for modulating the interference pattern. The interference in higher orders gives rise to frequency modulations that are multiples of the basic modulation frequency that must be filtered.

At a point in the interference plane, the interference is observed after filtering between the points M(x) and M(x+Δx) and between M(x) and M(x−Δx). An exact calculation shows that the phases of these two modulations are identical if the phase shifts $\phi(x)-\phi(x+\Delta x)$ and $\phi(x-\Delta x)-\phi(x)$ are identical, i.e. if the wave is locally planar, which is something of a hindrance.

SUMMARY OF THE INVENTION

In accordance with the invention, the lateral-duplication interferometer incorporates offset dihedrons. The shift in the wavefront stems from the offset of one of the dihedrons. At each point in the interference plane, only two points in the wavefront interfere. The interference pattern modulation is achieved by causing saw-tooth oscillation in one of the dihedrons, whereat the oscillation amplitude is preferably λ/4.

The wavefront analysis system embodying the invention does not carry any higher diffraction orders and causes interference between just two waves. The interference pattern is simplified and the optical efficiency improved. There is no need to suppose that the wave is locally planar. Whatever its shape, the only parameter that is measured is $\phi(x+\Delta x)-\phi(x)$. The lateral offset is easy to set.

BRIEF DESCRIPTION OF THE DRAWINGS

The invention will now be described in detail in relation to the appended drawings, in which.

DESCRIPTION OF THE PREFERRED EMBODIMENTS

Figure 1:
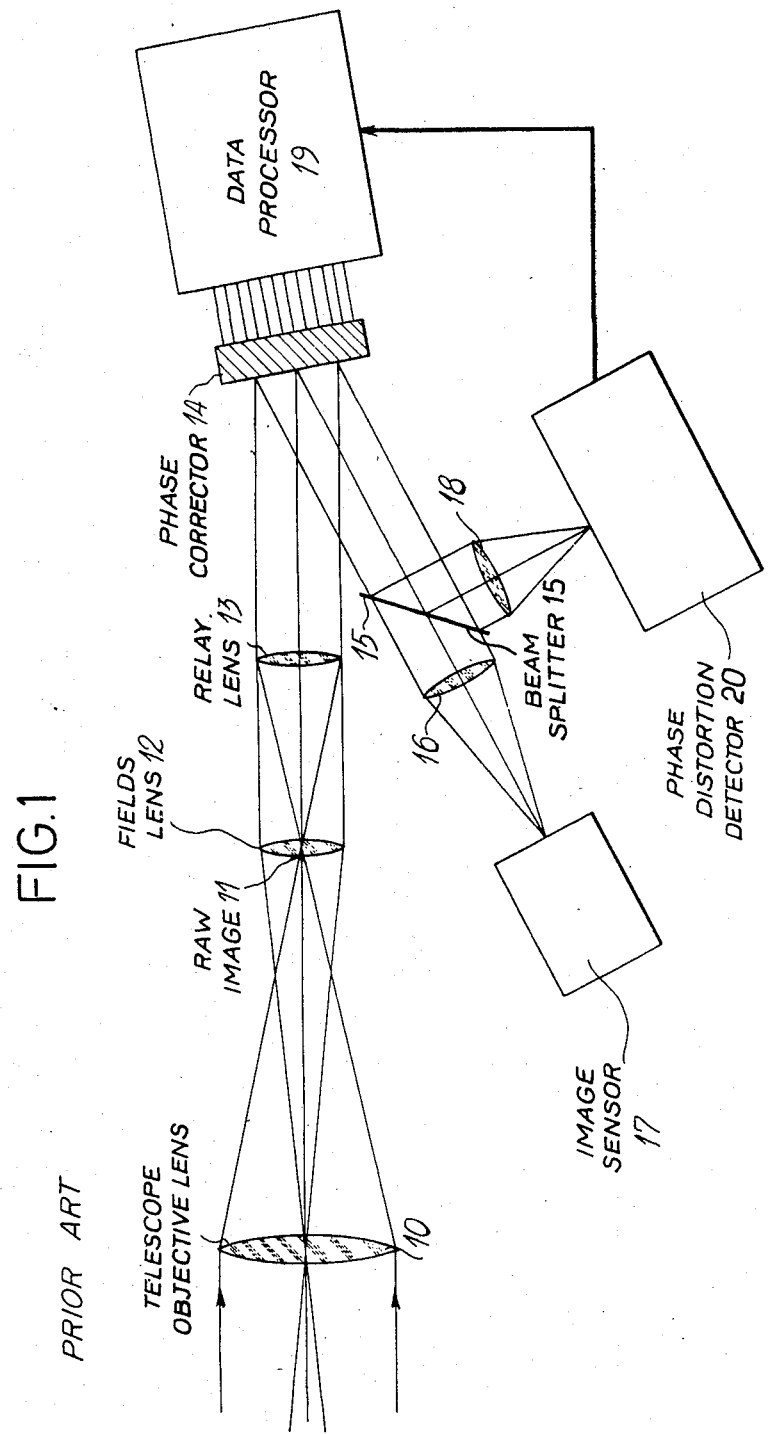
FIG. 1 is an optical diagram of a wave surface analyzing and correcting device as in the prior art.

With reference to FIG. 1, an objective lens 10 on the entrance pupil of a telescopic optical system delivers an un-corrected image of a distant object in the focal plane 11 of the optical system. This image can be severely distorted as a result of random phase inversions and phase shifts in the wavefront due to atmospheric turbulence or aberrations in the optical system.

In FIG. 1, the telescope is used as a refractive optical instrument but, of course, the prior art is valid also for reflective telescopic optical systems. A field lens 12 and a relay lens 13 are associated with the objective 10 to generate an image of the wavefront received by the entrance pupil on a phase correcting device 14 such as a deformable mirror. The wavefront image produced on the phase corrector 14 makes it possible for the latter to modify selectively the phase of the wavefront surface elements. The wavefront is reflected from the surface of the deformable mirror 14 towards a beam splitter 15 that separates the beam into a first beam focused by a lens 16 onto an image detector 17, and a second beam focused by a lens 18 onto a phase distorsion detector 20. This phase distorsion detector 20 controls the phase correcting device 14 by means of the data processor 19.

The phase correcting device 14 can be a deformable piezoelectrically controlled-mirror. The phase distorsion detecting device is a shear interferometer which, in the aforesaid Hardy patent, is of the duplicational type with a diffraction grating.

The present invention relates to a new interferometer used as the phase distortion detector 20.

Figure 2:
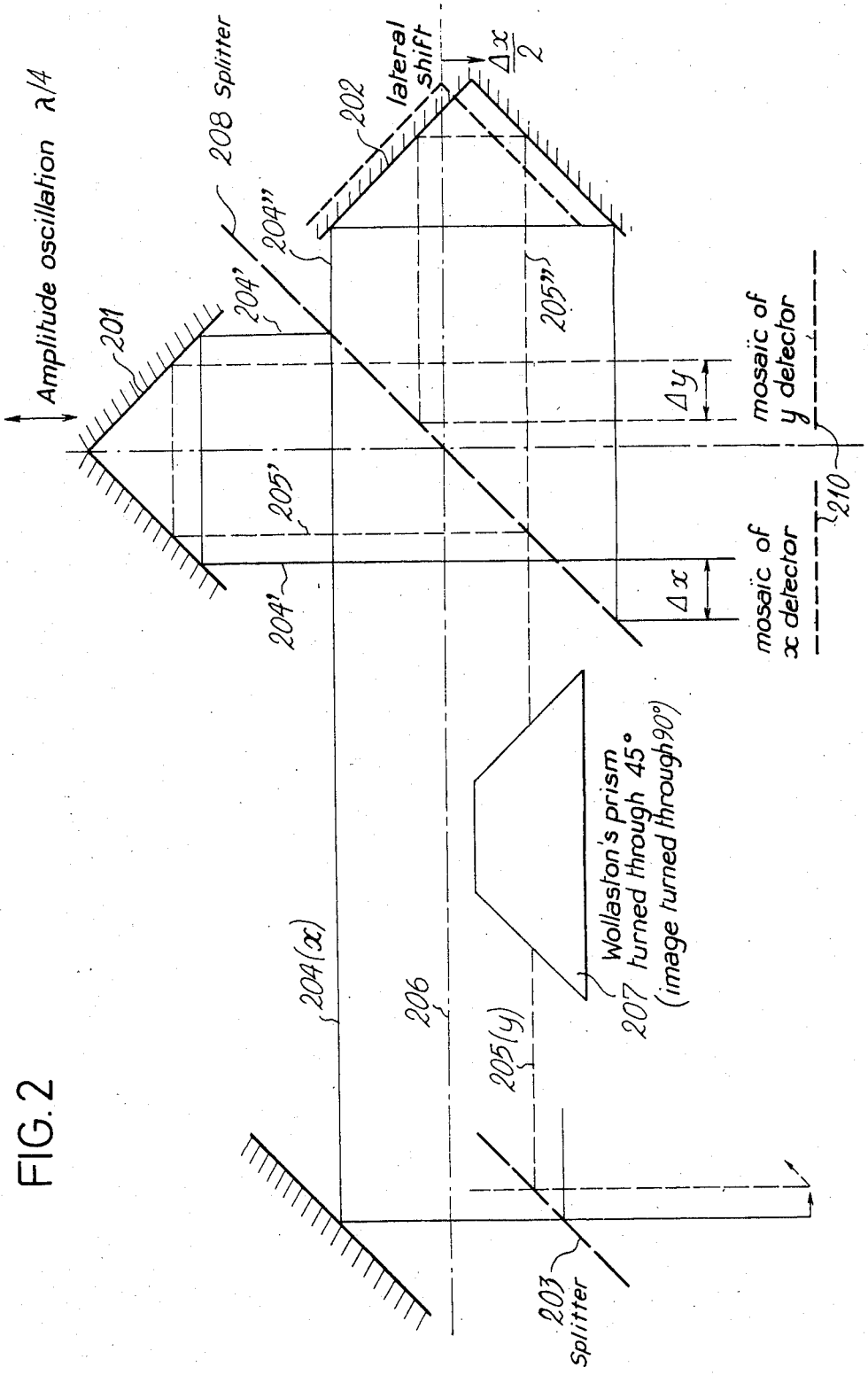
FIG. 2 represents the dihedral interferometer embodying the invention.

The interferometer with lateral duplication as shown in FIG. 2 comprises two reflective dihedrons 201 and 202 with an aperture of 90° and parallel edges. The beam from the telescope falls onto the splitter 203 where it is divided into two parallel beams 204 along x and 205 along y respectively situated on either side of a separative line 206 running through the edge of the dihedron 202. The beam 205 runs through a Wollaston 45° prism 207 that rotates the image through 90° about the beam axis.

Both beams 204 and 205 fall onto a splitter 208 that splits each beam into two beams 204′ and 204″, 205′ and 205″ that are respectively reflected by the two dihedrons 201 ad 202 and are brought back together to interfere in the interference plane 210.

Figure 3:
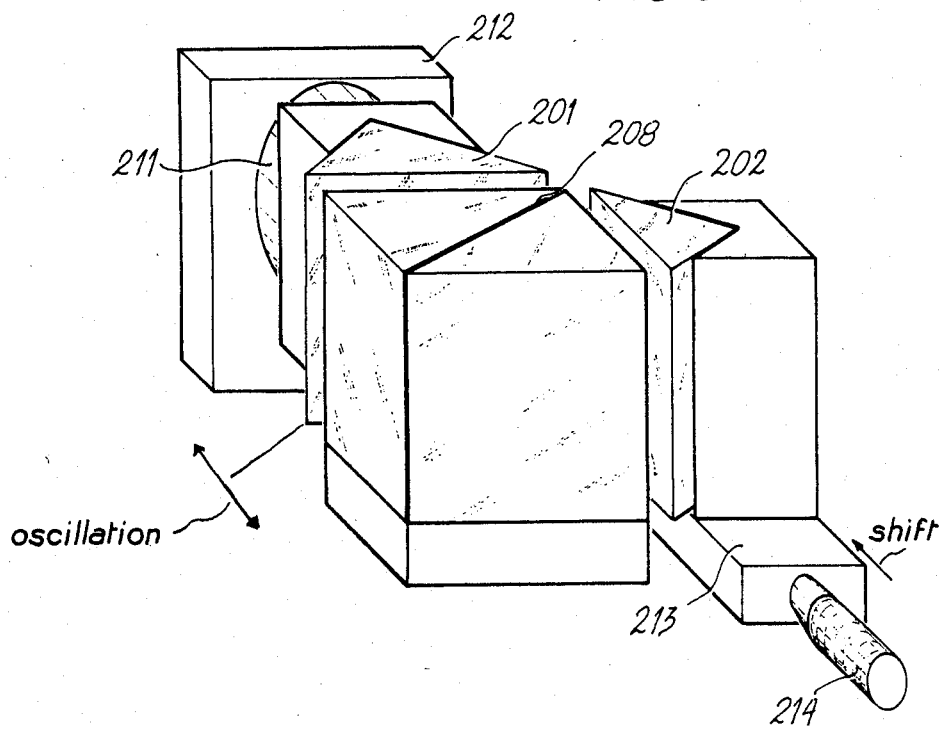
FIG. 3 represents this dihedral interferometer more precisely with a single analysis beam running therethrough.

Vibrational movement is imparted to the dihedron 201 by means of a piezoelectric chip 211 (FIG. 3) driven by a high voltage alternating current generator 212. The high voltage frequency is for example 100 Hz.

If the interfering vibrational phases are given as $\phi(x)$ and $\phi(x+\Delta x)$ and their phase difference is $$\Delta\phi(x,\Delta x)=\phi(x+\Delta x)-\phi(x),$$

then the maximum fringe intensity is given by $$|e^{j\phi(x+\Delta x)} + e^{-j\phi(x)}2| =$$

$$(e^{j\phi(x+\Delta x)} + e^{-j\phi(x)}) \times (e^{-j\phi(x+\Delta x)} + e^{j\phi(x)})$$

$$= 2[1 + \cos \Delta\phi(x, \Delta x)].$$

If the dihedron oscillates at a frequency of $\omega/2\pi$, the intensity of the point x is given by:

$$[1+\cos(\omega+\Delta\phi(x, \Delta x)]$$

The result then at a point of abscissa x is a signal having a modulated component with a phase shift with respect to the excitation signal that is equal to the phase difference sought after.

The dihedron 202 is mounted on a translational plate 213 and its position is set by a micrometer screw 214. The appropriate setting determines the dimensions $\Delta x$ and $\Delta y$ of the zone where the two wavefronts overlap. By way of an example, $\Delta x$ and $\Delta y$ can take values of a few tenths of a millimeter.

As a variation to the foregoing, the Wollaston prism can be eliminated. The analysis with respect to y is carried out with a second identical interferometer comprising two more reflective dihedrons arranged like the dihedrons 201 and 202, where the edges of the second interferometer are perpendicular to those of the first.

Figure 4:
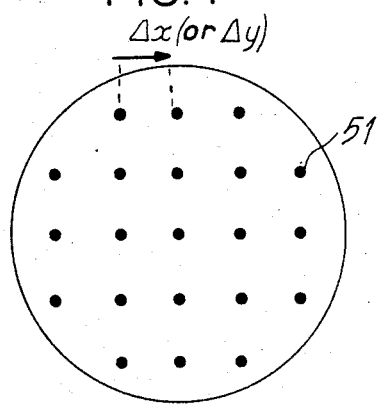
FIG. 4 represents an example of the actuator positions in the pupil plane.

FIG. 4 depicts the layout of the 21 actuators 51 of the deformable mirror.

Figure 5:
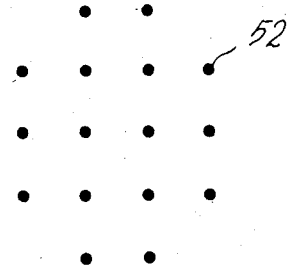
FIG. 5 represents an example corresponding to FIG. 4 showing the position of the photodetectors both for duplication along x and duplication along y.

FIG. 5 shows the layout of the 16 photodectors 52 for measuring the x-wise phase shift and the layout (identical) of the 16 photodectors 52 for measuring the y-wise phase shift. The data processor 19 computes the values of the activating voltages based on the 2×16 phase shift values along x and y. This computation is carried out as in the prior art, and as a result processor 19 is not embodied in the present invention.

What I claim is:

1. Apparatus for the real-time detection and correction of phase distortions in a wavefront being imaged by an optical system, comprising:

(a) means responsive to the phase differences between different areas of said distorted wavefront for simultaneously generating in real time phase correction signals indicative of phase corrections for different areas of said distorted wavefront to achieve a corrected wavefront;

(b) phase corrector means arranged with said distorted wavefront incident thereon and being responsive to said phase correction signals for changing in real time phase differences between different areas of said distorted wavefront and for changing the shape of said distorted wavefront to achieve said corrected wavefront; and (c) lateral shearing interferometer means arranged with said distorted wavefront incident thereon for determining relative phase differences between different areas of said distorted wavefront, and for generating signals indicative of said phase differences, said lateral shearing interferometer means including at least two reflecting dihedrons each having an aperture angle of 90°, said dihedrons having bisecting lines which cross at the center of the interferometer means for shifting one of the dihedrons through a predetermined distance parallel to the bisecting plane of the other dihedron, and means for vibrating said other dihedron parallel with its own bisecting plane.

2. Apparatus as defined in claim 1, wherein the means for vibrating said other dihedron parallel with its own bisecting plane comprises piezoelectric means driven by an alternating current.

3. Apparatus as defined in claim 1, wherein the dihedrons of said lateral shearing interferometer means receive two parallel beams onto zones of the dihedron reflecting phases which are different in each dihedron, one of said beams coming directly from the distorted wavefront, and further including means for rotating the other beam 90° about its own axis.

4. Apparatus as defined in claim 1, wherein said lateral shearing interferometer means comprises a pair of dihedrons each having an aperture of 90°, the edges of said dihedrons being perpendicular to each other.

5. Apparatus as defined in claim 1, wherein said means for vibrating a dihedron comprises a vibration device supplied by a sawtooth waveform alternative current.

* * * * *